United States Patent [19]

Callahan et al.

[11] Patent Number: 4,574,920
[45] Date of Patent: Mar. 11, 1986

[54] HYDROPNEUMATIC MONITORING DEVICE

[75] Inventors: James J. Callahan, Mentor; James M. Hammell, Aurora, both of Ohio

[73] Assignee: Lubriquip - Houdaille, Inc., Warrensville Heights, Ohio

[21] Appl. No.: 636,989

[22] Filed: Aug. 2, 1984

[51] Int. Cl.[4] ............................................. F16N 7/34
[52] U.S. Cl. ................................... 184/39.1; 239/412
[58] Field of Search ................. 184/50 R, 55 R, 55 A, 184/39, 6.26, 56 R; 417/191, 190; 239/412, 416.5, 417, 417.5, 398

[56] References Cited

U.S. PATENT DOCUMENTS

| 1,606,758 | 11/1926 | Greene | 184/56 R |
|---|---|---|---|
| 2,783,020 | 2/1957 | Kleczek | 251/62 |
| 2,811,958 | 11/1957 | Roush, Jr. | 123/46 |
| 3,227,378 | 1/1966 | Stewart | 239/412 |
| 3,323,531 | 6/1967 | Spellman | 137/68 |
| 3,536,293 | 10/1970 | Burris | 251/31 |
| 3,542,332 | 11/1970 | Chevalier | 251/63.6 |
| 3,810,484 | 5/1974 | Martini | 137/70 |
| 3,838,707 | 10/1974 | Wachowitz, Jr. | 137/312 |
| 3,868,890 | 3/1975 | Roberts et al. | 92/86 |
| 3,903,916 | 9/1975 | Waletzko | 137/312 |
| 4,010,769 | 3/1977 | DeLorenzo et al. | 137/312 |
| 4,015,777 | 4/1977 | Treder | 236/92 |
| 4,040,600 | 8/1977 | Coppola et al. | 251/63 |
| 4,073,944 | 2/1978 | Dawson | 425/146 |
| 4,091,832 | 5/1978 | Snyder et al. | 137/72 |

Primary Examiner—Edward K. Look
Attorney, Agent, or Firm—Hill, Van Santen, Steadman & Simpson

[57] ABSTRACT

A hydropneumatic monitoring device in which a hydraulic fluid passageway is controlled by a piston and plunger spring biased in one direction and shiftable by air pressure in opposition to the bias for aligning a passageway-connecting bypass in the plunger with the passageway which is intersected by the plunger. Air pressure metered through the piston passes to an air passage. Air pressure failure or blockage in the air passage cause deviation of the piston and plunger from a state of open passageway equilibrium, for blocking the passageway.

19 Claims, 8 Drawing Figures

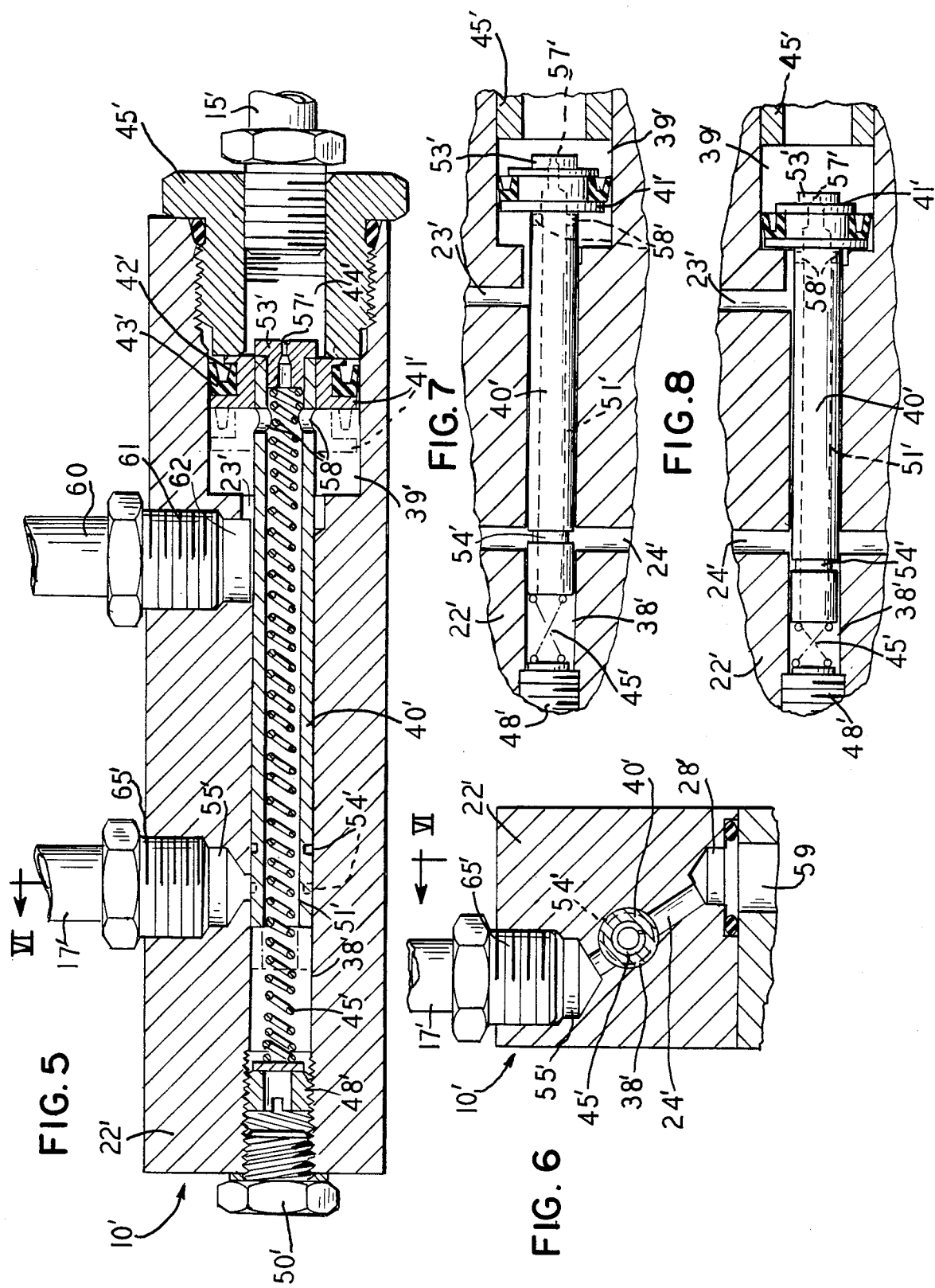

HYDROPNEUMATIC MONITORING DEVICE

BACKGROUND OF THE INVENTION

In systems, such as for lubrication which in their operation utilize hydraulic fluid as well as air pressure, undesirable variations in air pressure are disruptive of proper functioning. The detection and control of disruptive air pressure or air flow rate has been difficult of attainment.

By way of example lubrication systems where it is necessary at more or at less regular intervals to apply air pressure impulsed lubricant, especially lubricant in the form of an air spray, must avoid any prolonged malfunction which will starve the associated mechanism of relatively moving parts such as journals, bearings, gear boxes, and the like, in order to avoid overheating and breakdown.

Numerous and varied detection ad signalling devices have been employed with more or less success, but there has been need for a compact, simple, reliable device for monitoring air pressure or air flow rate deviations from a predetermined or preset level, and especially in connection with lubrication systems, and which device will be readily adaptable to convenient location in the system, even though the system may have fault or malfunction signalling means elsewhere therein.

SUMMARY OF THE PRESENT INVENTION

An important object of the present invention is to provide a new and improved hydropneumatic monitoring device in which a hydraulic fluid supply line is effectively controlled by combination of air pressure flow rate differential and biasing means.

Another object of the invention is to provide a new and improved monitoring device by which the flow rate of a gas can be monitored, with the occurrence of hydraulic blockage in a hydraulic flow line.

Still another object of the invention is to provide a new and improved device especially useful in monitoring hydropneumatic lubricating systems.

Pursuant to the principles of the present invention, there is provided in a hydropneumatic monitoring device means providing a body having therein an air passage leading therefrom, a hydraulic fluid passageway extending through the body and adapted to be connected at one end to a hydraulic fluid supply means and adapted to be connected at its opposite end to a point of use, an elongate plunger bore in the body traversing the passageway and having at one end a piston cylinder which communicates at its inner end with said air passage and is adapted to receive air under pressure at its outer end, a control plunger shiftably reciprocatable in the bore and having an outer end in the cylinder and having passageway-connecting means intermediate its length, a reciprocatable piston in the cylinder shorter than the cylinder and operatively associated with the outer end of the plunger, means for biasing the plunger with predetermined force longitudinally toward the outer ends and for thereby locating the passageway-connecting means out of alignment with the passageway, and means for metering the air under pressure through the piston to the passage and for effecting a predetermined air flow rate differential on opposite sides of the piston for limited driving of the piston in opposition to said biasing means and for thereby shifting the plunger for opening the passageway by aligning the passageway-connecting means with the passageway, the biasing means being set to cooperate with the air flow rate differential to maintain the piston and plunger in substantially a state of open passageway equilibrium.

BRIEF DESCRIPTION OF THE DRAWINGS

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure, and in which:

FIG. 5 is a longitudinal verticald sectional detail view showing a slight modification of the device;

FIG. 6 is a transverse vertical sectional detail veiw taken substantially along the line VI—VI in FIG. 5;

FIG. 7 is a schematic fragmentary longitudinal sectional veiw similar to FIG. 5 and showing the pressure sensitive components in a different operating phase; and FIG. 8 is a view similar to FIG. 7 and showing the operating components in a still different operating phase.

DETAILED DESCRIPTION

Figure 2:
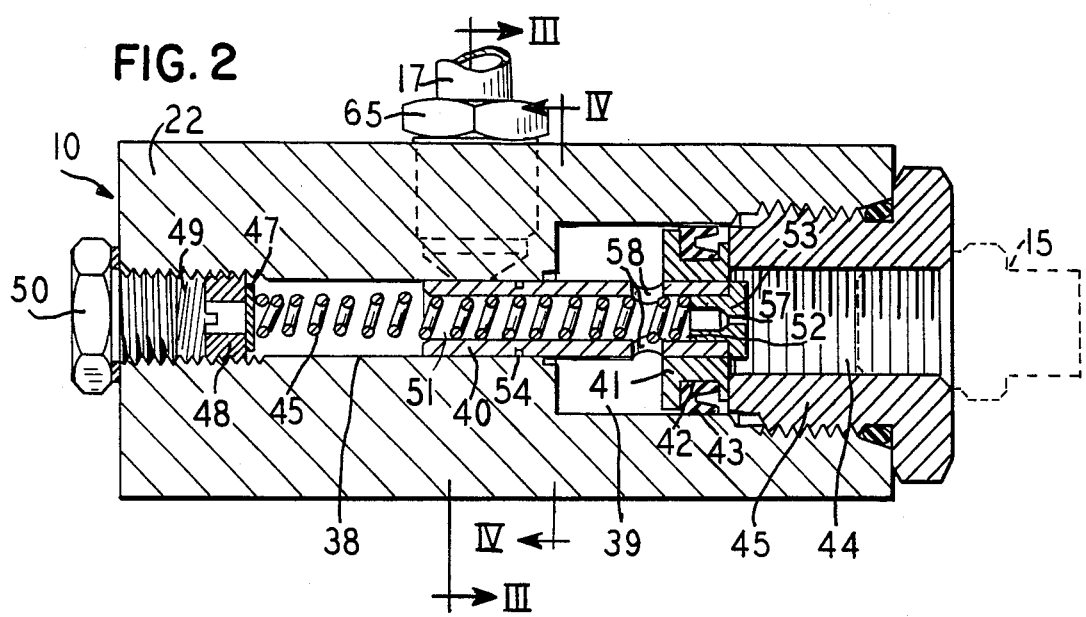
FIG. 2 is an enlarged longitudinal vertical sectional view through the hydropneumatic monitoring device of FIG. 1.

A hydropneumatic monitoring device 10 (FIG. 1) is especially adapted for monitoring increase or decrease from a preset or predetermined level in air flow rate, i.e. air pressure in a dynamic system. Although the device 10 may be utilized in various hydropneumatic systems where the flow rate of a gas may be monitored, an important utility is found in lubricating systems wherein the lubricant is sprayed from air nozzles and where monitoring of the air flow rate through the nozzles is desired. Although the device 10 may be mounted at different locations in a system, it is well suited for close association with a spray nozzle assembly 11 which may, for example, be mounted on or in connection with a point of lubricant use such as a gear box 12 into which an air generated spray 13 is adapted to be directed for lubrication of moving parts therein. The gear box may have pressure relief valve means 14 and also pressure switch means 14a for signalling in any well known manner loss of air pressure within the environment in the gear box 12.

Means for supplying air under predetermined pressure to the device 10 includes a duct 15. While the term "air" is used herein because most usages of the device may involve air, any preferred gas may be utilized and should be considered equivalent, i.e. air in a generic sense.

Means for delivering hydraulic fluid, i.e. lubricant, to the device 10 includes a delivery line 17 leading from a hydraulic fluid pressure responsive device 18 through which the hydraulic fluid is directed from source by way of a main line 19. In this instance the pressure sensitive device 18 controls a reciprocatable indicator pin 20 which is adapted to be projected for actuating a switch 21 connected with any preferred form of signal means.

In a simple and efficient construction, the device 10 comprises means such as a block providing a body 22 (FIGS. 1-4). As shown, the body 22 has an air passage 23 leading therefrom. A hydraulic fluid passageway 24 extends through the body 22. In this instance, the air spray nozzle means or assembly 11 is attached to the body 22 and has both the air passage 23 and the hydraulic fluid or lubricant passageway 24 appropriately connected thereto.

By way of example, the spray nozzle assembly 11 may be of a more or less conventional form having a member 25 provided with a stem 27 threaded into the body 22 for communication of the lubricant passageway with a chamber 28 from which a duct 29 controlled by a spring biased check valve 30 leads to an orifice 31 having a terminal nozzle discharging into a spray head or tip 32. The air passage 23 communicates by way of an annular distributor groove 33 into a plurality of air ducts 34 which lead to an annularly eductor orifice 35 cooperating with the lubricant orifice 31 for generation of lubricant spray through spray orifice 37 in the nozzle tip 32.

An elongate plunger bore 38 in the body 22 traverses the lubricant passageway 24 and has at one end a piston chamber or cylinder 39 from which the air passage 23 extends. In this instance the cylinder 39 is of substantially greater diameter than the bore 38 and the air passage 23 extends tangentially from the inner end of the cylinder. A control plunger 40 shorter than the bore 38 is shiftably reciprocatable in the bore and has its outer end in the cylinder 39. A piston 41 in the cylinder 39 is shorter than the cylinder and is operatively associated with the adjacent end of the plunger which extends from the bore 38 into the cylinder 39. In a preferred form the piston 40 comprises an annulus fixedly secured to the associated end of the plunger and having an annular peripheral groove 42 carrying a ring lip seal 43 for assuring efficient, substantially leak free retention of air pressure at the head or outer end of the piston 40 which is exposed to air pressure supply means delivering through an inlet port 44 into the outer end of the cylinder. In a desirable form, the port 44 extends through a nipple 45 removably threaded into the body 22 at the outer end of the cylinder 39 and of a large diameter to provide an access opening large enough for assembling the piston 40 into the cylinder. The air supply line 15 is secured in connection with the port 44 and nipple 45 in usual fashion.

Figures 1, 3:
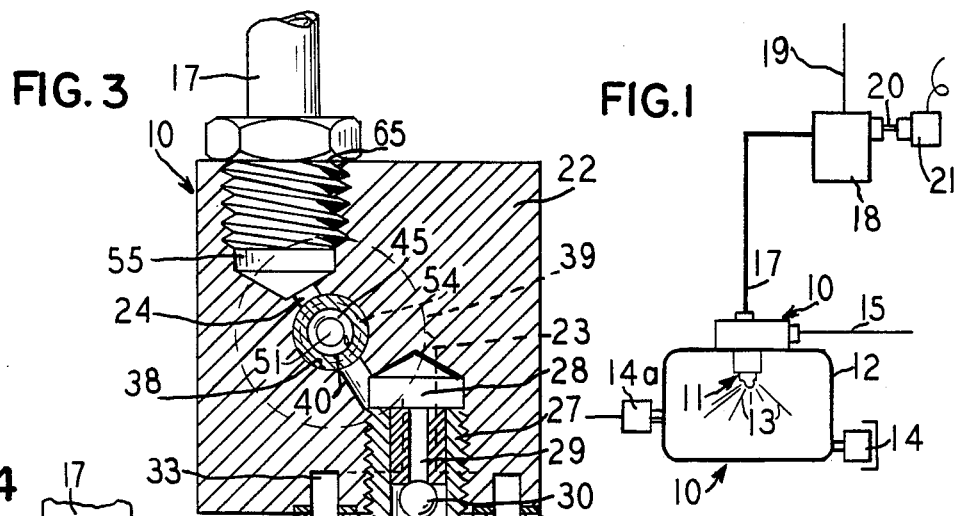
FIG. 1 is a schematic view of a lubricating system embodying the hydropneumatic monitoring device of the present invention.
FIG. 3 is a vertical transverse sectional view taken substantially along the line III—III in FIG. 2.
Figure 4:
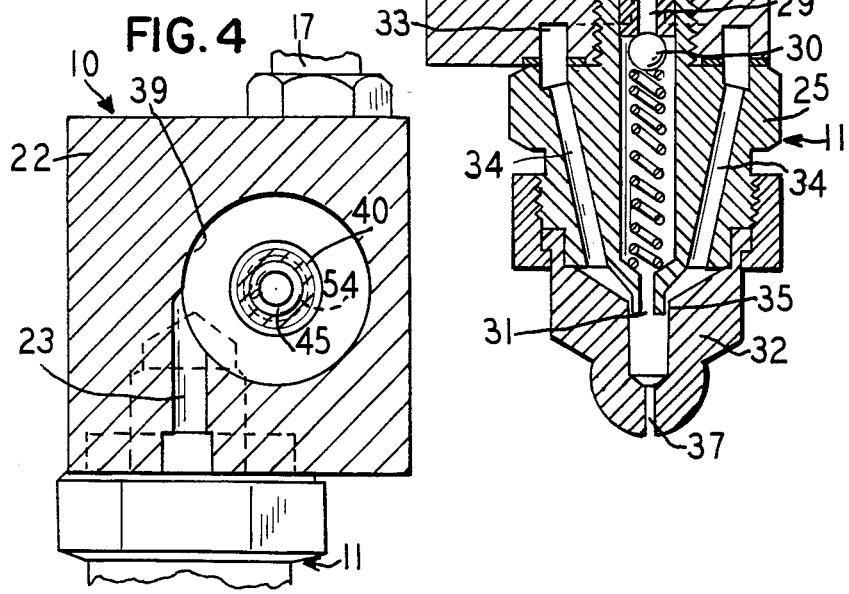
FIG. 4 is a vertical sectional detail view taken substantially along the line IV—IV in FIG. 2.

Means are provided comprising an expansion spring 45 for biasing the plunger 40 in one longitudinal direction toward closing the passageway 24, wherein a cylindrical area of the plunger 40 extends in blocking relation across the passageway as best seen in FIGS. 2 and 3. In a preferred form, the spring 45 comprises an elongated coiled cylindrical expansion spring seated at one end on shoulder means comprising a washer disk seat 47 thrusting against a threaded internal adjusting nut 48 which is received in an outer end threaded section 49 of the bore 38 and is accessible for adjusting the tension of the spring 45 as desired. A threaded, removable closure plug 50 normally protectively closes the adjacent threaded terminal end of the bore. In the passive condition of the assembly, the piston is biased against the stop shoulder provided by the inner end of the nipple 45.

From its adjustable abutment seat end, the spring 45 extends into and through a hollow bore 51 in the hollow tubular plunger 40. Within the plunger 40, and adjacent to the piston 41, the biasing spring 45 thrusts against a shoulder 52 provided by means of a nipple or orifice plug 53 secured into the outer end of the bore 51 in the plunger 40.

Air pressure supplied through the port 44 is delivered to the outer end of the cylinder 39 and acts on the piston 41 in opposition to the biasing spring 45 for shifting the plunger 40 into a position wherein passageway-connecting means comprising an annular external control of bypass groove 54 intermediate the length of the plunger 40 registers with the passageway 24 for connecting the chamber 28 at one end of the passageway 24 with inlet port 55 at the opposite end of the passageway and to which the supply line 17 is connected.

In order to assure that the passageway 24 will only be opened by registration of the control groove 54 in the plunger 40 with the passageway 24 when air pressure conditions are as desired in the system with which the device 10 is associated, means are provided for metering the air under pressure through the piston 41 to the air passage 23 and for effecting a predetermined air flow rate differential on opposite sides of the piston for driving the piston in opposition to the biasing means spring 45 for shifting the plunger into the passageway opening position. To this end, the nipple 53 at the head or outer end of the piston 41 has a metering orifice 57 of predetermined size through which air under pressure from the outer side or end of the piston is metered to the inner or back side or end of piston and more particularly the rear portion of the cylinder chamber 39 to which the metered air passes by way of ports 58 opening through the wall of the hollow plunger tube adjacent to the piston. Thence, the metered air flows to and through the air passage 23. The arrangement is such that when the air flow rate through the metering orifice 57 is corelated with the compression imparted to the biasing spring 45 by the adjusting nut 48, and the location of the plunger control groove 54, having regard to the air pressure supplied, an equilibrium condition can be attained wherein the control groove 54 registers with the passageway 24. Small changes in inlet air pressure and consequent flow rates can be attained by adjusting the spring compression by means of the nut 48. Larger changes can be attained by changing the size of the orifice 57.

Any significant deviation from the equilibrium condition such as may be caused by a malfunction or failure in the air supply or air passage, will cause the plunger 40 to be shifted from or fail to attain the passageway connecting or opening position. That is, if the air pressure is too great at the entry port end of the cylinder 39, or there is a leak or break or other undesirable drop in pressure in or related to the air passage 23, the piston 41 and the plunger 40 will be caused to override the biasing spring 45 to the extent of causing the control groove 54 of the plunger to override the passageway 24 and the plunger blocks the passageway. Should there be an air pressure failure in the supply line or a blockage in respect to the air passage 23, the piston 41 will not be moved from its fully spring biased position and the passageway 24 will remain blocked.

In the slightly modified form of the invention as depicted in FIGS. 5-8, the hydrodynamic monitoring device 10' is much the same as the device 10 except that the body 22', the bore 38', the plunger 40' and the biasing spring 45' may be somewhat longer to accommodate a more spaced apart orientation of the air passage 23' and the hydraulic fluid passageway 24'. As shown in FIG. 6 the chamber 28' to which the passageway 24' leads is adapted to communicate with a duct 59 instead of directly with a spray nozzle. Also the air passage 23' instead of communicating directly with a spray nozzle communicates with a duct 60 connected by way of a nipple 61 in an outlet 62 with the air passage 23' leading off from the inner end of the piston chamber 39'. In other respect the device 10' is substantially the same as the device 10, and the description of structure by way of primed reference characters and function will be understood to be the same and should be so understood.

For illustrative purposes the device 10' has been selected for demonstration in greater particular of certain performance characteristics common to both of the devices 10 and 10' and it should be understood that the following description of a typical example applies with equal effect to both forms of the device. Air from the pressure regulated source may be supplied to the inlet air port 44' at 30 psi. This pressure acts on the head area of the pneumatic piston 41' which may be 0.625 inch in diameter so that about 9.2 lbs of force are developed on the head end of the piston. The air travels from the piston head side of the piston chamber 39' and is metered through the orifice 57', which may of 0.030 inch diameter, at the rate of 0.9 scfm and arrives at the inner or back side of the piston chamber 39' at 15 psig, which is common to the normal operating pressure in the passage 23'. This pressure acting on the back side of the pneumatic piston develops at 4.6 lb force in an opposite direction from the initial 9.2 lbs force. the net force of 4.6 lbs acting on the pneumatic piston 41' is transmitted along the longitudinal axis of the piston and the plunger 40' and compresses the spring 45'. The force of the spring 45' is adjustable by means of the adjustment screw 48' which serves to further compress or to relax the spring from a given setting. The rate of the spring 45' may be selected such that when the piston 41' has travelled 0.178 inch the spring develops 4.6 lbs opposing force and holds the piston in equilibrium. The equilibrium position of the piston is where the connecting channel or groove 54' is aligned with the passageway 24', allowing hydraulic fluid to flow through the passageway.

The central bore 51' vents the chamber area at the inner end of the plunger 40' to the 15 psi prevailing under normal operating conditions in the piston chamber 39' back of the piston 41'. This aids in balancing the differential areas with respect to the front and back sides of the piston 41' and allows lubricating hydraulic fluid to leak through the sliding tolerance between the bore 38' and the plunger 40' and to be carried out in the air stream through the air passage 23'. This arrangement is also advantageous in that any need for sealing means along the plunger 40' is avoided, and eliminates frictional forces whereby operation of the monitoring device is more reliable and consistent.

The various adjustments may be made to provide for a reasonable operating tolerance range such, for example, as about 10% from the equilibrium position involving either increase or decrease in air pressure without blocking the hydraulic fluid passageway. Should there be a greater than the 10% deviation caused, for example by loss in pressure in the passage 23' or blockage of the air outlet line, the pressure differential at the piston 41' is disrupted. For example, if there is a blockage in or affecting the air passage 23', the biasing force of the spring 45' will override the air source pressure and cause shifting of the plunger 41' toward the right as veiwed in FIG. 5, whereby the passageway-connecting groove 54' will be shifted from the dashed position to the full line position and the passageway 24' will be blocked. This same situation will occur, of course, should the air source pressure drop to an undesirable level.

On the other hand, should a break or serious leak occur in respect to the air passage 23', the pressure on the backside of the piston 41' may drop sufficiently or altogether below the equilibrium force so that the pressure on the outer side of the piston 41' will overcome resistance of the spring 45' and cause shifting of the plunger 40' from the flow-through alignment position of the bypass groove 54' as shown in FIG. 7 to the passageway blocking position shown in FIG. 8.

In setting up or adjusting the device 10 or 10' for operation, and more particularly effecting adjustments for desired operation of the air pressure actuated hydraulic fluid passageway controlling plunger 40, 40' inspection access enabling direct visual observation of the plunger and more particularly the passageway-connecting groove 54, 54' is adapted to be effected through the hydraulic fluid inlet 55, 55'. The arrangement, as best observed in FIGS. 3 and 6, is such that the hydraulic fluid inlet may be exposed for inspection by removing a connector nipple 65, 65' from the inlet. At its inner end, the inlet 55' is located relatively close to the bore 38, 38' so that visualization of the plunger 40, 40' may be readily seen through the short adjacent section of the passageway 24, 24'. Operation of the plunger 40, 40', and more particularly with respect to the connecting groove 54, 54', is readily observable through the open inlet 55, 55' while air pressure is applied to the piston 41, 41', and various adjustments are effected such as in the air pressure applied, and the compression loading of the spring 45, 45' by means of the adjustment screw 48, 48', and the like. This greatly facilitates attaining optimum operating results from the device 10, 10'.

It will be understood that variations and modifications may be effected without departing from the spirit and scope of the novel concepts of this invention.

We claim as our invention:

1. In a hydropneumatic monitoring device:
   means providing a body having therein an air passage leading therefrom;
   a hydraulic fluid passageway extending through said body and adapted to be connected at one end to a hydraulic fluid supply means and adapted to be connected at its opposite end to a point of use;
   an elongate plunger bore in said body traversing said passageway and having at one end a piston cylinder which communicates at its inner end with said air passage and is adapted to receive air under pressure at its outer end;
   a control plunger shiftably reciprocatable in said bore and having an outer end in said cylinder and having passageway-connecting means intermediate its length;
   a reciprocatable piston in said cylinder shorter than said cylinder and operatively associated with said outer end of said plunger,
   means for biasing said plunger with predetermined force longitudinally toward said outer end and for thereby locating said passageway-connecting means out of alignment with said passageway;

and means for metering said air under pressure through said piston to said passage and for effecting a predetermined air flow rate differential on opposite sides of said piston for limited driving of said piston in opposition to said biasing means and for thereby shifting said plunger for opening said passageway by aligning said passageway-connecting means with said passageway;

said biasing means being set to cooperate with said air flow rate differential to maintain said piston and plunger in substantially a state of open passageway equilibrium.

2. A device according to claim 1, wherein said plunger is a hollow tube, said metering means communicates with the interior of said tube at said outer end of the plunger, and ports opening through said tube from said interior to said cylinder behind said piston.

3. A device according to claim 2, wherein said biasing means comprises a coiled compression spring extending within said plunger tube and thrusting at its end within the tube against a shoulder within the tube and at its opposite end thrusting against a shoulder in said bore spaced from the inner end of said plunger.

4. A device according to claim 3, wherein said shoulder in said bore comprises an adjustment screw by which the compressive thrust of said spring is adjustable.

5. A device according to claim 2, wherein said metering means comprises a metering orifice member, and means for replaceably securing said orifice member in the plunger tube at said outer end of the tube.

6. A device according to claim 1, wherein said means for supplying air to said cylinder comprises an inlet having a nipple secured therein and providing a stop shoulder facing inwardly at the outer side of said cylinder, and said piston being thrustable against said stop shoulder by action of said biasing means.

7. A device according to claim 1, wherein said hydraulic fluid passageway is adapted to convey lubricating fluid, a spray nozzle, means securing said spray nozzle to said body, said nozzle having lubricant orifice means communicating with said passageway and directed from said nozzle, a spray tip on said nozzle cooperating with said orifice means, and means for effecting communication of said air passage with said spray tip.

8. A device according to claim 1, in combination with a lubricant spray nozzle, means for securing said spray nozzle to said body, and said passageway and said passage communicating cooperatively with said spray nozzle.

9. A device according to claim 1, wherein said plunger has intermediate its length an annular groove providing said passageway-connecting means, and said plunger has length portions thereof at each opposite side of said groove and adapted for blocking said passageway at either side of said groove.

10. A device according to claim 9, wherein said piston and plunger are adapted to be thrust by the air pressure inwardly from said open passageway equilibrium upon the failure of pressure in respect to said passage whereby said plunger will then block said passageway.

11. A device according to claim 1, wherein said hydraulic fluid passageway has an inlet of such a size and located in such relation to said bore that visual inspection access to said plunger and said passageway-connecting means may be had through said inlet, and means for connecting said hydraulic fluid supply means to said inlet.

12. A device according to claim 1, wherein said piston carries sealing means slidably engaging said cylinder.

13. A device according to claim 1, wherein said air passage leads directly from said inner end of said cylinder and extends laterally away from said bore.

14. A method of operating a hydropneumatic monitoring device which comprises a body having therein an air passage leading therefrom, a hydraulic fluid passageway extending through said body and adapted to be connected at one end to a hydraulic fluid supply means and adapted to be connected at its opposite end to a point of use, an elongated plunger bore in said body traversing said passageway and having at one end a piston cylinder which communicates at it inner end with said air passage and is adapted to receive air under pressure at its outer end, a control plunger shiftably reciprocatable in said bore and having an outer end in said cylinder and having passageway-connecting means intermediate its length, a reciprocatable piston in said cylinder shorter than said cylinder and operatively associated with said outer end of said plunger, said method comprising:

biasing said plunger with predetermined force longitudinally toward said outer end and thereby locating said passageway-connecting means out of alignment with said passageway;

metering said air under pressure through said piston to said passage and effecting a predetermined air flow rate differential on opposite sides of said piston for limited driving of said piston in opposition to said biasing means, and thereby shifting said plunger for opening said passageway by aligning said passageway-connecting means with said passageway;

and setting said biasing means to cooperate with said air flow rate differential and thereby maintaining said piston and plunger in substantially a state of open passageway equilibrium.

15. A method according to claim 14, wherein said plunger has passageway blocking surface at either side of said passageway-connecting means, and preventing alignment of said passageway-connecting means with said passageway when there is either a blockage in said passage or an air pressure failure.

16. A method according to claim 14, which comprises effecting shifting of said plunger to override said passageway-connecting means from alignment with said passageway when a pressure failure occurs in said passage.

17. A method according to claim 14, which comprises holding said piston and plunger against air pressure shifting when there is a blockage in said air passage.

18. A method according to claim 14, which comprises visually inspecting said plunger and passageway-connecting means through an inlet to said passageway.

19. A method according to claim 18, which comprises effecting adjustment of said biasing means while inspecting through said inlet.

* * * * *